March 13, 1928.

H. W. PLEISTER 1,662,537

MACHINE AND PROCESS FOR REMOVING EXCESS MOLTEN MATERIAL

Filed Sept. 3, 1926

Inventor;
Henry W. Pleister
By Harold J. Penner
ATTORNEY

March 13, 1928.

H. W. PLEISTER 1,662,537

MACHINE AND PROCESS FOR REMOVING EXCESS MOLTEN MATERIAL

Filed Sept. 3. 1926  4 Sheets-Sheet 2

INVENTOR
Henry W. Pleister,
BY
Harold D. Penney ATTORNEY

March 13, 1928.  
H. W. PLEISTER  
1,662,537  
MACHINE AND PROCESS FOR REMOVING EXCESS MOLTEN MATERIAL  
Filed Sept. 3, 1926  
4 Sheets-Sheet 3
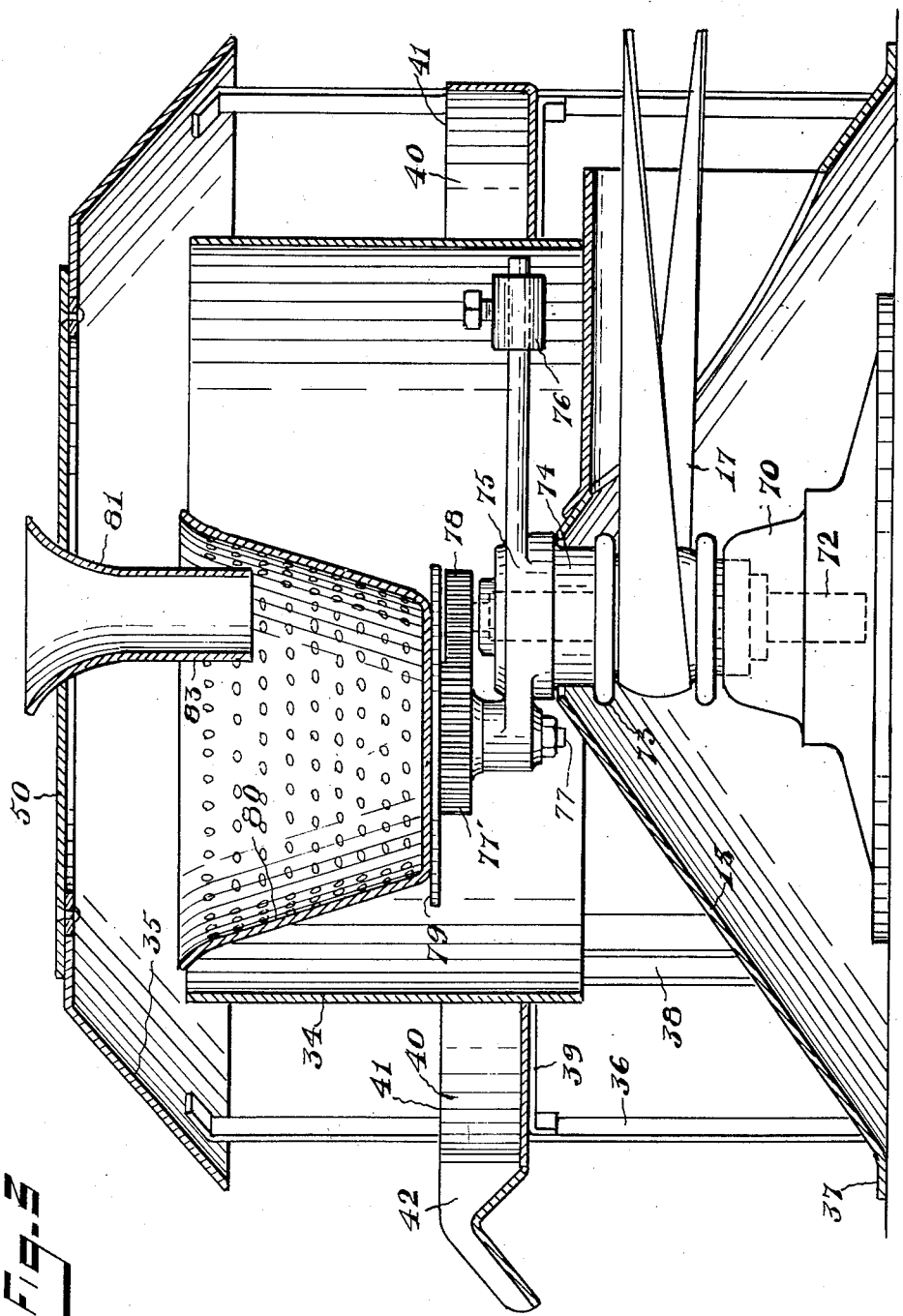
INVENTOR  
*Henry W. Pleister,*  
BY  
*Harold J. Cenney*  
ATTORNEY March 13, 1928.
H. W. PLEISTER
1,662,537
MACHINE AND PROCESS FOR REMOVING EXCESS MOLTEN MATERIAL
Filed Sept. 3. 1926　　4 Sheets-Sheet 4
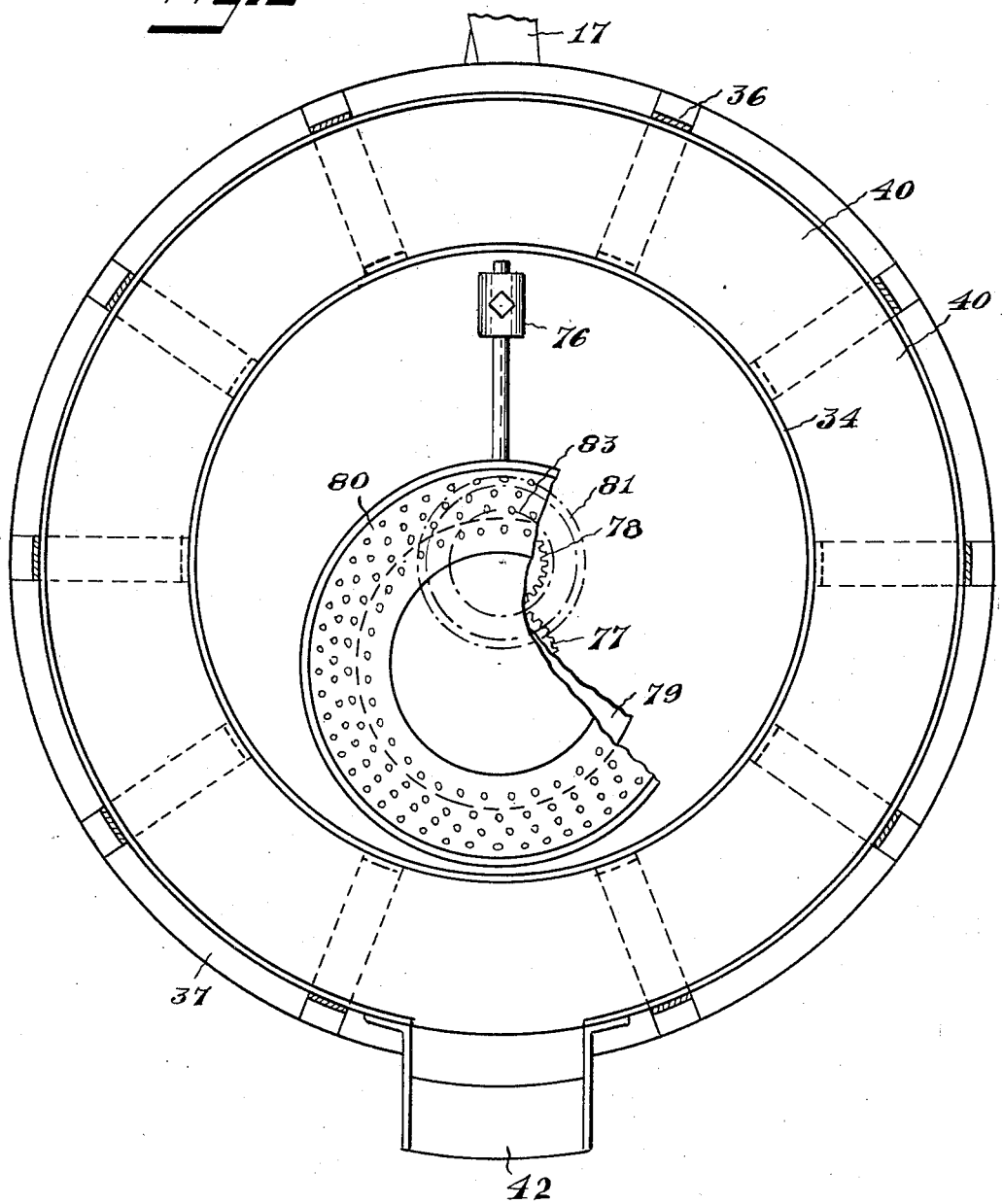
INVENTOR
*Henry W. Pleister,*
BY
ATTORNEY Patented Mar. 13, 1928.

1,662,537

UNITED STATES PATENT OFFICE.

HENRY W. PLEISTER, OF WESTFIELD, NEW JERSEY, ASSIGNOR, BY MESNE ASSIGNMENTS, TO HENRY B. NEWHALL CORPORATION, OF GARWOOD, NEW JERSEY, A CORPORATION OF NEW JERSEY.

MACHINE AND PROCESS FOR REMOVING EXCESS MOLTEN MATERIAL.

Application filed September 3, 1926. Serial No. 133,446.

This invention relates to machines and processes for removing excess molten metal from nuts, bolts, screws and other small articles being galvanized or otherwise coated, and more particularly to planetary machines and processes of the general type described in my U. S. Patent No. 1,530,614, issued March 24, 1925 for method of metal coating, and my U. S. application Serial No. 551,373, filed April 10, 1922 for centrifugal coating machine.

One object of the invention is to provide a planetary apparatus and method of this kind whereby the small articles may be suddenly and quickly subjected to planetary motion and centrifugal force successively on all sides before the articles have had time to cool appreciably, whereby the excess metal may be more effectively removed than would be the case if the machine had first to be brought from rest to high speed.

Another object of the invention is to provide a machine and method of this kind whereby the articles may be continuously fed to and taken from the machine while the machine is operated at high speed continuously.

Another object of the invention is to provide a machine and method of this kind whereby the articles may be given an initial violent jarring for initially removing a large percentage of the excess metal while the metal is very fluid, after which the articles are subjected to planetary motion.

Other objects of the invention are to improve generally the simplicity, economy and efficiency of such machines and methods and to provide a machine of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with two improved continuous feed planetary centrifugal machines each of which includes a bowl-shaped perforated basket to which planetary motion is imparted from a suitable rotating member.

In one of the machines having a rotating bracket fast on said member and formed with an axial hopper receiving articles from a stationary hopper is an inclined impact chute adapted to hurl articles against the side of the basket.

In the other machine a single stationary hopper having an upwardly flaring mouth has a lower cylindrical part extending downwardly into the basket between the axis and the side of the basket for all positions of the basket.

In both machines an impact baffle disposed around the upper edge of the basket concentric with the orbit thereof violently jars the articles and deflects them to a suitable receptacle.

In the accompanying drawing, showing by way of example, two of many possible embodiments of the invention, Fig. 1 is a vertical axial sectional view, partly in elevation, showing one form of the machine;

Fig. 3 is a vertical sectional view, partly in elevation, showing the other form of the machine; and Fig. 4 is a plan showing the machine of Fig. 3.

Figure 1:
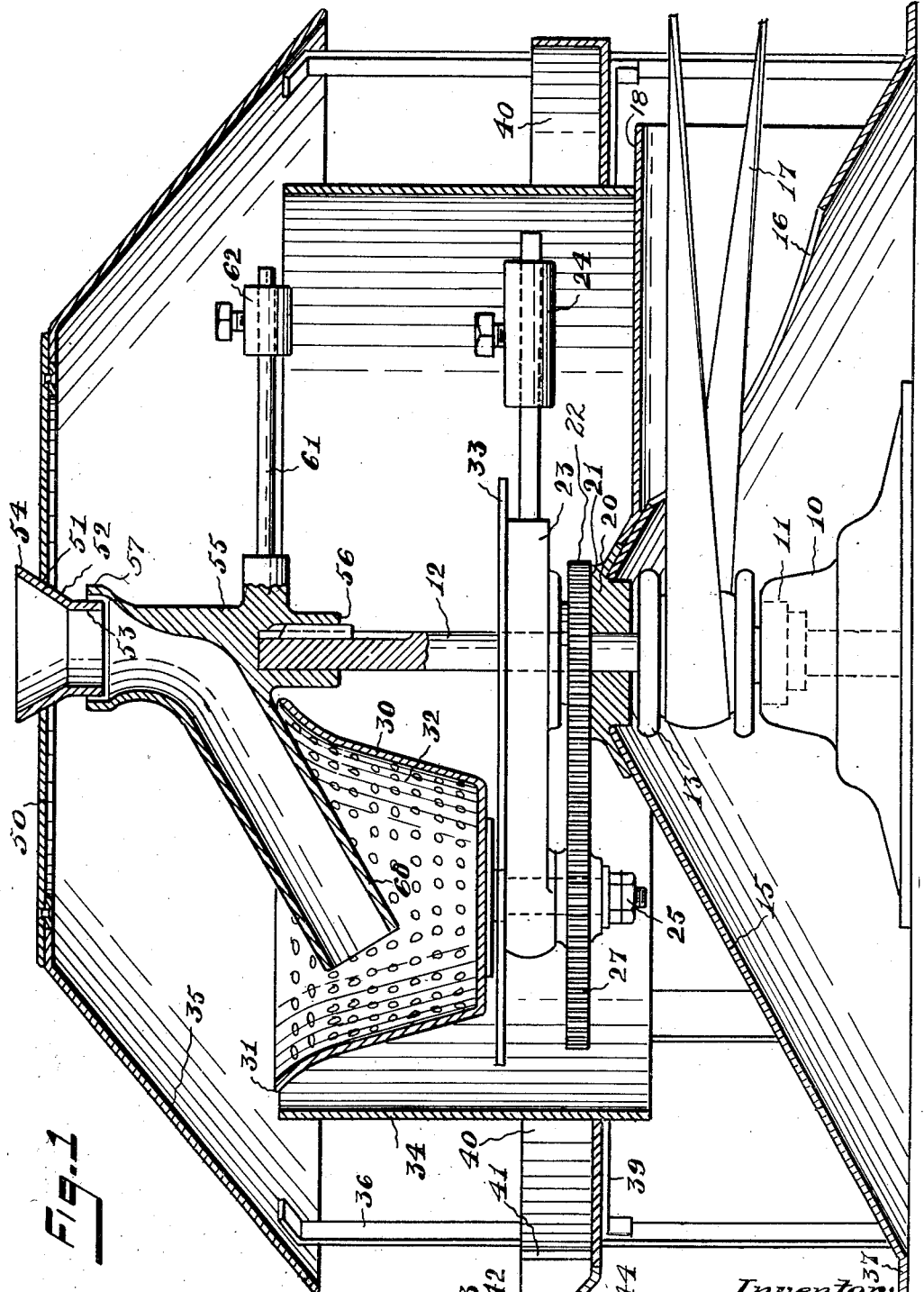
Figure 2:
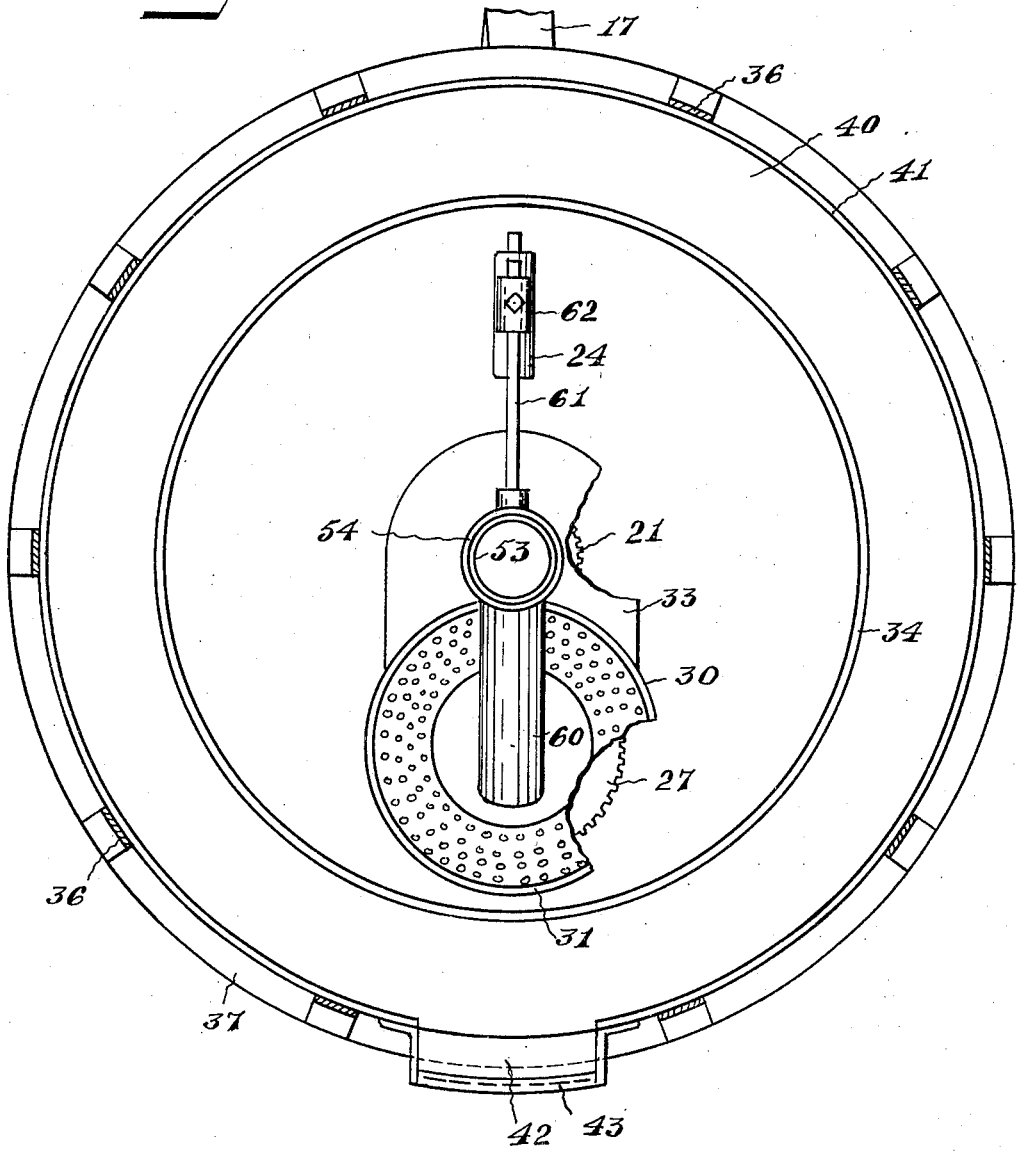
Fig. 2 is a plan thereof, parts being removed.

The rotary parts of the machine of Figs. 1 and 2 are carried on a pedestal 10 provided with an axial bearing 11 therein carrying a rotary upright main shaft 12 carrying a belt driven pulley 13 fast thereon just above the pedestal.

An upwardly pointing approximately truncated cone-shaped shield 15 disposed around said pedestal and pulley is provided with an opening 16 for the belt 17 over which is disposed a belt shield 18 covering the adjacent portion of the belt.

A bearing block 20 secured fast on the upper part of the cone and receiving said shaft is provided with an annular shoulder 21 therearound on which is fixed a ring gear 22 above which is disposed a beam 23 fast on said shaft and provided with an adjustable counterpoise 24 at one end and carrying in the other end a vertical rotary stub shaft 25. A large gear 27 is mounted fast on the lower end of the stub shaft in mesh with the fixed gear 22 whereby planetary motion is imparted to the stub shaft as the main shaft rotates.

A bowl-shaped rotary basket 30 fast on the upper end of said stub shaft has a flared lip 31 slightly lower than and spaced from the upper end of the main shaft 12 and steeply inclined perforated sides 32 for the passage of molten metal. A table 33 fast on the top face of the beam extends over and protects the gears 22 and 27 from the molten metal.

An inner cylindrical spelter baffle 34 disposed around the path or orbit of said basket to stop molten metal thrown from the basket has its upper edge approximately level with the upper edge of the basket to permit articles slightly upwardly directed from said lip to be thrown over the baffle against a sheet metal annular impact deflecting baffle 35 disposed around the edges of the spelter baffle and outwardly and downwardly inclined at an angle of about 45 degrees, for jarring molten metal from the articles and projecting them downwardly. Legs 36 on the outer flange 37 of said shield 15 are secured to the lower edge of the deflecting baffle 35 to support the latter; while a series of brackets 38 intramarginally disposed around the main shield support the spelter baffle 34 and are provided at the upper end with outwardly disposed horizontal portions 39 secured to said legs respectively and supporting an annular trough 40 disposed around the spelter baffle, which may hold water or other cooling medium for receiving the downwardly deflected articles. The outer wall 41 of the trough is provided with an upwardly and downwardly inclined outlet chute 42 through which the articles may be raked from the trough, the upper part 43 of the floor 44 of the chute being above the required level from the water.

A cover 50 resting on the deflecting baffle 35 is provided with a central opening 51 receiving a stationary hopper 52 having a lower cylindrical part 53 and an upwardly flaring mouth 54, the latter resting on the edge of said opening. A rotating bracket 55 mounted fast on the upper end of said main shaft 12 is formed with a downwardly extending cylindrical shaft receiving portion 56, an upwardly extending revolving axial hopper 57 receiving said lower part 53 of the fixed hopper, and an outwardly and downwardly inclined revolving impact chute 60 forming a continuation of the revolving hopper 57 and adapted centrifugally to hurl articles against the side of the basket 12 as the articles are fed to the hopper thus to jar off a large portion of the molten metal. A counterpoise arm 61 extending radially from said bracket on the side opposite to the impact chute carries a counterpoise 62 adjustable thereon for different weights and rates of feed of articles fed to the hopper.

The operation of the machine of Figs. 1 and 2 is as follows:

The machine being continuously rotating at high speed, the articles are continuously fed through the stationary hopper 52 to the rotating hopper for initially slinging the articles outwardly through the chute 60 for violently jarring the articles against the side of the basket as they are thus slung, thereby immediately removing a large percentage of the molten metal.

The articles are then subjected to planetary motion by the basket, and as the basket is outwardly flared, the articles moving upwardly and away from the planetary axis, are retarded by gravity. As the articles are thus agitated, tumbled and shuffled and subjected to combined centrifugal and centripetal force successively form all sides of the articles the excess molten metal is thoroughly removed from all sides and at the same time the articles are thrown from side to side of the basket and thus shuffled and prevented from freezing together or to the sides of the basket.

The molten metal is not appreciably subjected to centripetal force and leaves the basket immediately by centrifugal force. The centripetal force of the basket holds the articles from following the molten metal, while the centrifugal force acting upon the articles causes them to climb up the sides of the basket.

When the articles reach the upper part of the basket, they are projected over the lip 31 of the basket and again violently jarred against the impact baffle 35 to remove further metal, after which they continue downwardly separately in free air to harden the coating with the articles substantially out of contact with each other to permit the coating to become smooth as it hardens. Then the articles are cooled in the cooling liquid of the trough 40.

In the form of invention of Figs. 3 and 4, a pedestal 70 carries a fixed vertical shaft 72 on which is rotatable a belt driven pulley 73 carrying a hub 74 fast thereon on which is mounted fast a beam 75 provided with an adjustable counterpoise 76 at one end and a vertical stud 77 at the other. A large gear 77' rotatable on said stud meshes with a pinion 78 fast on said fixed shaft, whereby rotation of the pulley and revolution of the beam imparts planetary motion to the gear and to a table 79 fast on said gear and extending over and protecting the gear and pinion, and the bowl-shaped rotary basket 80 fast on the table and having a flared lip, and steeply inclined perforated sides for the passage of molten metal, the sides extending around the extended axis of said shaft 72.

The other parts of the apparatus are substantially the same as in Figs. 1 and 2, except the stationary hopper 81 has its lower cylindrical part 83 extending downwardly into the basket between the axis of the basket and the side thereof, the feed means having no moving part.

The operation of the machine of Figs. 3 and 4 is substantially the same as that of Figs. 1 and 2, except that the step of the initial jarring is not present.

I claim as my invention:

1. A process for removing excess molten metal from articles, said process comprising violently jarring the articles; and immediately subjecting the articles to planetary motion.

2. A process for removing excess molten metal from articles, said process comprising continuously feeding the articles; shuffling and subjecting the articles as they are fed to planetary motion, at the same time moving them upwardly and away from the planetary axis; whereby the articles are subjected to combined centrifugal and centripetal force successively from all sides of the article; continuously projecting the articles from their path; and violently jarring them as they are projected.

3. A process for removing excess molten metal from articles, said process comprising subjecting the articles to planetary motion; and then immediately violently jarring them.

4. A process for removing excess molten metal from small articles being coated, said process comprising continuously feeding the articles to a fixed center; initially slinging the articles outwardly from said center; violently jarring the articles as they are thus slung thereby immediately to remove a large percentage of the metal; then subjecting the articles to planetary motion at the same time retarding and moving the articles upwardly and away from the planetary axis whereby the articles are shuffled and subjected to combined centrifugal and centripetal force successively from substantially all sides of the article to remove molten metal from all sides; then projecting the articles from the upper part of their path; again violently jarring the articles to move further metal; continuing movement of the articles separately in free air to harden the articles substantially out of contact with each other; and then cooling the articles in a cooling liquid.

5. An apparatus for removing excess molten metal from articles, said apparatus comprising means for continuously and successively feeding the articles; means for immediately subjecting the articles to planetary motion as they are fed; and means for then immediately violently jarring them, all parts of said apparatus being sufficiently strong and heat resistant to withstand the heat and impact of the articles and molten metal to which they are subjected.

6. An apparatus for removing excess molten metal from small articles being coated, said apparatus comprising means for continuously feeding the articles; means for shuffling and subjecting the articles as they are fed to planetary motion, at the same time moving them upwardly and away from the planetary axis; whereby the articles are subjected to combined centrifugal and centripetal force successively from all sides of the article and continuously projecting the articles from their path; and means for violently jarring them as they are projected, all parts of said apparatus being sufficiently strong and heat resistant to withstand the heat and impact of the articles and molten metal to which they are subjected.

7. An apparatus for removing excess molten metal from articles, said apparatus comprising means for violently jarring the articles; means for then immediately subjecting the articles to planetary motion; and means for then immediately again violently jarring them, all parts of said apparatus being sufficiently strong and heat resistant to withstand the heat and impact of the articles and molten metal to which they are subjected.

8. An aparatus for removing excess molten metal from articles, said apparatus comprising an upright main shaft; a bowl-shaped perforated basket; means driven from said shaft for imparting planetary motion to the basket; a stationary hopper; and a bracket fast on the upper end of said main shaft and formed with an axial hopper receiving the lower part of the stationary hopper and an inclined impact chute forming a continuation of the axial hopper and adapted to hurl articles against the side of the basket, all parts of said apparatus being sufficiently strong and heat resistant to withstand the heat and impact of the articles and molten metal to which they are subjected.

9. An apparatus for removing excess molten metal from articles, said apparatus comprising a bowl-shaped perforated basket; means for imparting planetary motion to the basket; an impact baffle disposed around the basket at the level of the upper edge thereof; and a rotating member formed with an inclined impact chute adapted to hurl articles against the side of the basket, all parts of said apparatus being sufficiently strong and heat resistant to withstand the heat and impact of the articles and molten metal to which they are subjected.

10. In combination, a rotary upright main shaft; a fixed bearing block receiving said shaft; a fixed gear fast on said block; a beam fast on said shaft; a stub shaft rotatable in one end of the beam; a gear fast on the stub shaft meshing with the fixed gear; and a perforated basket fast on the stub shaft.

11. In combination, means for removing excess molten metal from articles and discharging the articles; and a trough disposed to catch said articles and adapted to receive water or other cooling medium for immersing the articles, a wall of the trough being provided with an upwardly and downwardly inclined outlet chute through which the articles may be raked from the trough, the upper part of the floor of the chute being above the required level of the liquid.

12. An apparatus for removing excess molten metal from articles, said apparatus comprising a bowl-shaped perforated basket; means for imparting planetary motion to the basket; means to discharge articles into the basket in all positions of the basket; an inner baffle around said basket coaxial with the orbit of the basket and having the upper edge near the edge of the basket; an impact baffle disposed around the upper edge of the inner baffle and outwardly and downwardly inclined for receiving articles from the basket and projecting them downwardly; and a trough around said inner baffle for receiving the downwardly deflected articles, the outer wall of the trough being provided with an upwardly and downwardly inclined outlet chute.

Signed at New York in the county of New York and State of New York this 2nd day of September A. D. 1926.

HENRY W. PLEISTER.